United States Patent [19]

Harada et al.

[11] Patent Number: 5,234,383
[45] Date of Patent: Aug. 10, 1993

[54] TEMPERATURE COMPENSATED TENSIONER

[75] Inventors: Norio Harada, Iruma; Nobuto Kozakura, Hanno; Katsuya Nakakubo, Tokorozawa, all of Japan

[73] Assignee: Tsubakimoto Chain Co., Osaka, Japan

[21] Appl. No.: 963,704

[22] Filed: Oct. 20, 1992

[30] Foreign Application Priority Data

Oct. 21, 1991 [JP] Japan .............................. 3-093601[U]

[51] Int. Cl.$^5$ ............................................... F16H 7/08
[52] U.S. Cl. ..................................... 474/110; 474/138
[58] Field of Search ............... 474/101, 103, 104, 109, 474/110, 111, 113–117, 133–138

[56] References Cited

U.S. PATENT DOCUMENTS 4,708,696 11/1987 Kimura et al. .................. 474/138 X
4,911,679 3/1990 Inoue et al. .......................... 474/110
5,073,149 12/1991 Maruyama et al. ............. 474/110 X Primary Examiner—Thuy M. Bui
Attorney, Agent, or Firm—Howson and Howson

[57] ABSTRACT

In a fluid tensioner of the piston and cylinder type an annular element is provided either on the piston or on the wall of the cylinder. In the case of an annular element on the wall of the piston, the annular element has a coefficient of linear expansion greater than that of the wall of the cylinder. In the case of an annular element on the wall of the cylinder, the annular element has a coefficient of linear expansion less than that of the piston material. In both cases, the annular element provides compensation for changes in hydraulic fluid viscosity to maintain a constant leak-down rate, allows for flexibility in the choice of piston, rod and cylinder materials.

2 Claims, 2 Drawing Sheets

TEMPERATURE COMPENSATED TENSIONER

BRIEF SUMMARY OF THE INVENTION

This invention relates to tensioners and particularly to fluid-filled piston-type tensioners of the kind used to maintain a specified tension in a toothed belt for driving an engine camshaft for the like. The invention relates more particularly to improvements for compensating for changes in fluid viscosity with temperature.

A typical fluid-filled, piston-type tensioner comprises a piston slidable within a cylinder and dividing the cylinder into front and rear chambers. A rod extends from the piston through the front chamber, and through a seal, to the exterior of the cylinder. The piston fits loosely within the cylinder so that a narrow clearance is provided between the piston and the cylinder wall for the passage of hydraulic fluid from the rear chamber to the front chamber as the piston retracts, i.e. as the volume of the rear chamber decreases and the volume of the front chamber increases. The piston is urged by a spring in the projecting direction in order to apply tension to a flexible chain or belt, such as a toothed belt. A passage is provided for the flow of hydraulic fluid from the front chamber to the rear chamber as the piston moves in the projecting direction. This passage can be provided in the piston itself. The passage is provided with a check valve which allows the flow of hydraulic fluid from the front chamber into the rear chamber in order to permit rapid movement of the piston in the projecting direction. The check valve, however, prevents rapid flow of hydraulic fluid through the passage in the opposite direction, i.e. from the rear chamber to the front chamber. Thus, as the piston moves in the retracting direction, hydraulic fluid must pass through the restricted clearance between the piston and the wall of the cylinder, so that the piston can only proceed gradually when moving in the retracting direction.

Operating characteristics of a fluid tensioner vary with temperature. With a rise in temperature, the viscosity of the hydraulic fluid in the cylinder decreases. This affects the operation of the tensioner by increasing the speed of retraction of the piston. That is, an increase in temperature increases the so-called "leakdown value." To solve the problem caused by temperature changes, U.S. Pat. No. 4,708,696, dated Nov. 24, 1987, suggests a tensioner which is capable of maintaining a constant leak-down value, notwithstanding temperature changes, by using a piston made of a material having a coefficient of linear expansion greater than that of the cylinder material.

In a fluid tensioner, the piston rod is required to have good shock resistance at its forward end and high strength throughout its length. Also, the piston is required to have a high coefficient of linear expansion and good wear resistance. To meet the first requirement, it is desirable to form the piston from a carbon steel such as "FC" carbon steel, i.e. a carbon steel designated "FC" under Japanese industrial standards. On the other hand, to meet the second requirement, it is desirable to form the piston from a material such as a copper alloy. Because it is desirable to make the rod and piston from different materials, it is difficult to integrate a high-strength, shock-resistant rod with a wear-resistant piston capable of maintaining a constant leak-down value.

The principal object of this invention is to provide a fluid tensioner in which the piston and rod are made from the same material, which is capable of maintaining a substantially constant leak-down value, and which has desirable characteristics such as strength and shock resistance of the rod, and resistance of the piston to wear. A further object of the invention is to provide a tensioner having a substantially constant leak-down value and having some or all of the above-mentioned desirable characteristics, in which the piston and rod are unitary.

The tensioner in accordance with the invention comprises a cylinder having a cylindrical interior wall, said cylinder being filled with hydraulic fluid; a piston slidable in said cylinder and separating the interior of said cylinder into a front chamber and a rear chamber, said piston having a periphery and loosely fitting into said cylinder with a slight clearance between the periphery of the piston and the interior wall of the cylinder for the restricted flow of hydraulic fluid past said piston from said rear chamber to said front chamber, and said piston also having a front side facing said front chamber and a rear side facing said rear chamber; a rod on said piston extending from the front side thereof and through said front chamber; spring means urging said piston in the direction to reduce the size of said front chamber and thereby cause said rod to move outward from said front chamber; means providing a path for the flow of hydraulic fluid from said front chamber to said rear chamber, and check valve means in said path for allowing flow of hydraulic fluid through said path from said front chamber to said rear chamber, and preventing flow of hydraulic fluid through said path from the rear chamber to the front chamber, whereby tension is applied to a toothed belt by the force of said spring means acting through said rod. The tensioner achieves the foregoing objectives by virtue of an annular member which may be provided either on the outer periphery of the piston or on the inner wall of the cylinder. In the case in which the annular member is provided on the piston, the material of the annular member is selected to have a coefficient of linear expansion greater than that of the cylinder material. In the case in which the annular member is on the inner wall of the cylinder, the annular member is chosen to have a coefficient of linear expansion less than that of the material of the piston.

In the operation of the tensioner, as the viscosity of the hydraulic fluid decreases with increasing temperature, the clearance between the annular member and the piston or cylinder wall decreases to compensate for the reduced viscosity of the fluid. Similarly, as the temperature of the hydraulic fluid increases with increasing temperature, the clearance increases. Accordingly the leak-down value is kept substantially constant.

The use of the annular members of different coefficients of linear expansion on the inner periphery of the cylinder or separately on the outer periphery of the piston makes it possible to form the piston and rod as a unit, to maintain a substantially constant leak-down value in the tensioner, and, at the same time, to achieve high strength and shock resistance in the rod.

Further objects, details and advantages of the invention will become apparent from the following description, when read in conjunction with the drawings.

DETAILED DESCRIPTION

Figure 3:
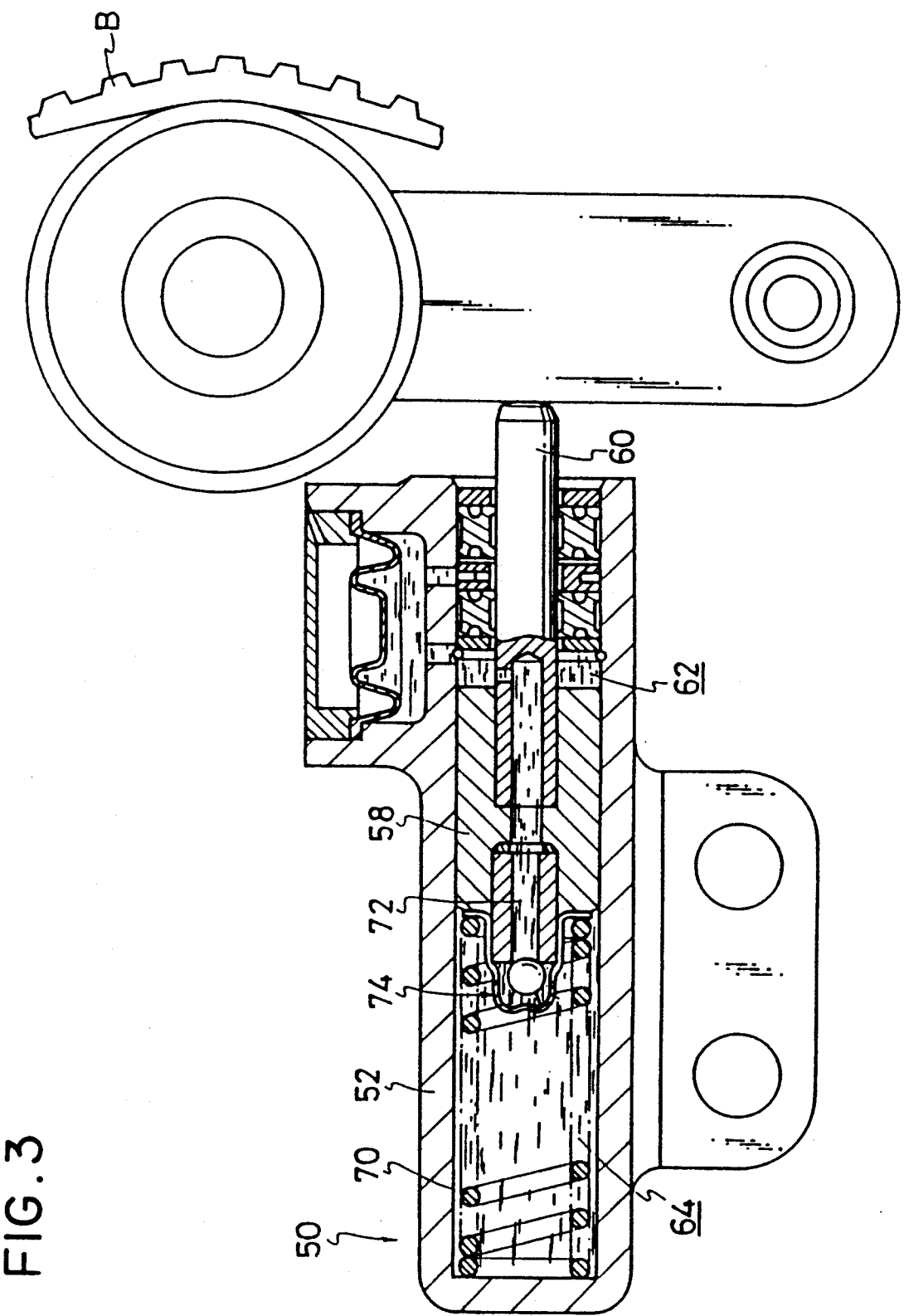
FIG. 3 is a longitudinal sectional view of a conventional tensioner.

Referring first to FIG. 3, which shows a fluid tensioner of the type in general use, the tensioner 50 comprises a piston 58 which fits loosely within a fluid-filled cylinder 52, and is slidable therein with a narrow clearance between the piston and the interior wall of the cylinder. The piston separates the cylinder 52 into a front chamber 62 and a rear chamber 64. A rod 60 is secured to the piston and extends from the side of the piston facing the front chamber, through the front chamber, and through a seal, to the exterior of the cylinder, where it engages a pivoted arm having an idler roller in engagement with a toothed belt B. A spring 70, within the rear chamber applies a force to the piston, urging it in the direction such that rod 60 moves outward from the cylinder to apply tension to toothed belt B. A hydraulic fluid passage 72 in the piston provides fluid communication between front chamber 62 and the rear chamber 64. A check valve 74 at the end of passage 72 allows the hydraulic fluid to flow from the front chamber into the rear chamber, but prevents flow in the opposite direction. Consequently, the piston is able to move rapidly in the projecting direction, but movement in the opposite direction can take place only gradually, as it requires hydraulic fluid to move, from the rear chamber 64 to the front chamber 62, through the restricted space between the periphery of the piston and the inner wall of the cylinder.

Figure 1:
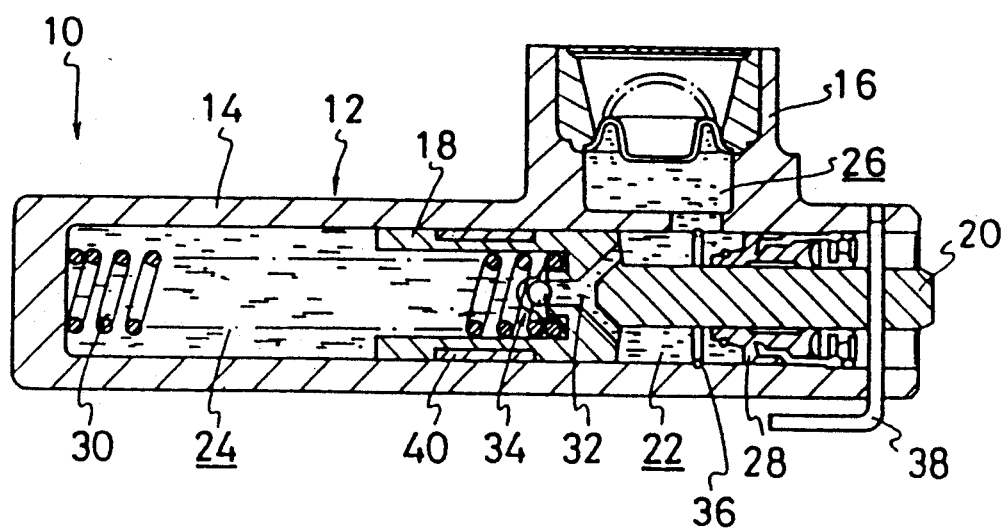
FIG. 1 is a longitudinal sectional view of a first embodiment of a tensioner in accordance with the invention.

In FIG. 1, tensioner 10 comprises a cylinder 12 which consists of a section 14 having a cylindrical inner wall, and a reservoir section 16 formed on the outer side of section 14. A piston 18 fits loosely within cylinder section 14 and is slidable axially therein, a narrow clearance being provided between the periphery of the piston and the inner wall of the cylinder. The cylinder has an opening at one end provided with a seal 28. Piston 18 has a rod 20 on its side facing toward the open end of the cylinder side. Rod 20 protrudes outward through the seal to the exterior of the cylinder, and is engageable with a pivoted arm (not shown) as in FIG. 3, which supports an idler roller for applying tension to a toothed belt.

Piston 18 separates the interior of cylinder section 14 into a front chamber 22 and a rear chamber 24. Front chamber 22 communicates with a hydraulic fluid reservoir 26 located inside of the reservoir section 16. Seal 28, in front chamber 22, presses tightly against the inner periphery of cylinder section 14, and has an inner lip pressing against rod 20. The front chamber 22 is bounded by part of the inner wall of cylinder section 14, piston 18, rod 20, and seal 28. A spring 30, provided in rear chamber 24, applies a force to the piston, urging it in the direction in which rod 20 moves outward from the cylinder.

Front chamber 22, rear chamber 24 and reservoir 26 are filled with hydraulic fluid. Piston 18 has a hydraulic fluid passage 32 connecting the front chamber 22 to the rear chamber 24. A check valve 34 is provided on the rear chamber side of passage 32. Check valve 34 allows hydraulic fluid to flow freely from the front chamber 22 into the rear chamber 24, but blocks the flow of the hydraulic fluid from rear chamber 24 into front chamber 22. A ring 36 limits movement of piston 18 in the projecting direction. A temporary stop pin 38 prevents rod 20 from projecting outward from the cylinder until the tensioner is mounted on an engine.

A recess formed in the outer periphery of the piston 18 receives an annular member 40, which may be provided with a longitudinal slot (not shown) to facilitate its installation on piston 18. The material of annular member 40 is selected to have a coefficient of linear expansion greater than that of the cylinder material. The material of the annular member 40 can be selected from among such materials as copper alloys, synthetic resins, and other materials having high coefficients of linear expansion. While any of a wide variety of materials having the desired coefficient of linear expansion can be used, copper alloys are preferred for durability and wear resistance.

Figure 2:
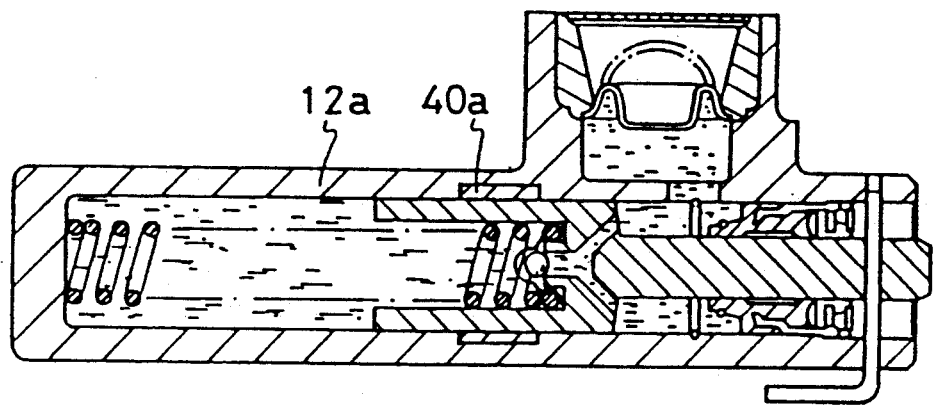
FIG. 2 is a longitudinal sectional view of a second embodiment of the tensioner.

In the second embodiment of the tensioner, as shown in FIG. 2, an annular member 40a is provided in a recess formed in the interior wall of a cylinder 12a. Annular member 40a has a coefficient of linear expansion less than that of the piston material. It is formed from a thin material and is provided with a longitudinal slot (not illustrated) so that it can be distorted in order to install it in the cylinder.

With either embodiment of the invention, the cross-sectional area of the clearance around the piston for flow of hydraulic fluid from the rear chamber to the front chamber is controlled by expansion and contraction of the annular member in such a way as to maintain the leak-down value substantially constant. That is, in the case of FIG. 1, as the temperature increases, and the viscosity of the hydraulic fluid decreases, the annular member expands at a rate greater than the rate at which the cylinder wall expands, thereby decreasing the clearance for the flow of hydraulic fluid past the piston and maintaining a constant leak-down value. Similarly, in the case of FIG. 2, as the piston expands radially, annular member 40a also expands so that the clearance between the annular member and the piston varies to the extent required to maintain a constant leak-down value. Since the annular member, in both cases, is installed separately and not an integral part of the piston or cylinder, it is possible to form the piston and rod of the same material, and even to form the piston and rod as a unit without there being any restrictions as to the material used for the piston and rod.

Various modifications can be made to the fluid tensioner as described herein. For example, while the above-described embodiments utilize an annular member fitted on the piston or on the cylinder, it is possible to provide a tensioner having a similar function by integrally joining an annular member of a different material to the piston or cylinder by flame spraying. Still other modifications can be made without departing from the scope of the invention as defined in the following claims.

We claim:

1. A toothed belt tensioner, comprising: a cylinder having a cylindrical interior wall, said cylinder being filled with hydraulic fluid; a piston slidable in said cylinder and separating the interior of said cylinder into a front chamber and a rear chamber, said piston having a periphery and loosely fitting into said cylinder with a slight clearance between the periphery of the piston and the interior wall of the cylinder for the restricted flow of hydraulic fluid past said piston from said rear chamber to said front chamber, and said piston also having a front side facing said front chamber and a rear side facing said rear chamber; a rod on said piston extending from the front side thereof and through said front chamber; spring means urging said piston in the direction to reduce the size of said front chamber and thereby cause said rod to move outward from said front chamber; means providing a path for the flow of hydraulic fluid from said front chamber to said rear chamber, and check valve means in said path for allowing flow of hydraulic fluid through said path from said front chamber to said rear chamber, and preventing flow of hydraulic fluid through said path from the rear chamber to the front chamber, whereby tension is applied to a toothed belt by the force of said spring means acting through said rod; wherein the improvement comprises an annular member, on the outer periphery of said piston, said annular member having a coefficient of linear expansion greater than that of said cylinder.

2. A toothed belt tensioner, comprising: a cylinder having a cylindrical interior wall, said cylinder being filled with hydraulic fluid; a piston slidable in said cylinder and separating the interior of said cylinder into a front chamber and a rear chamber, said piston having a periphery and loosely fitting into said cylinder with a slight clearance between the periphery of the piston and the interior wall of the cylinder for the restricted flow of hydraulic fluid past said piston from said rear chamber to said front chamber, and said piston also having a front side facing said front chamber and a rear side facing said rear chamber; a rod on said piston extending from the front side thereof and through said front chamber; spring means urging said piston in the direction to reduce the size of said front chamber and thereby cause said rod to move outward from said front chamber; means providing a path for the flow of hydraulic fluid from said front chamber to said rear chamber, and check valve means in said path for allowing flow of hydraulic fluid through said path from said front chamber to said rear chamber, and preventing flow of hydraulic fluid through said path from the rear chamber to the front chamber, whereby tension is applied to a toothed belt by the force of said spring means acting through said rod; wherein the improvement comprises an annular member on the interior wall of said cylinder, said annular member having a coefficient of linear expansion less than that of the material of said piston.

* * * * *